UNITED STATES PATENT OFFICE.

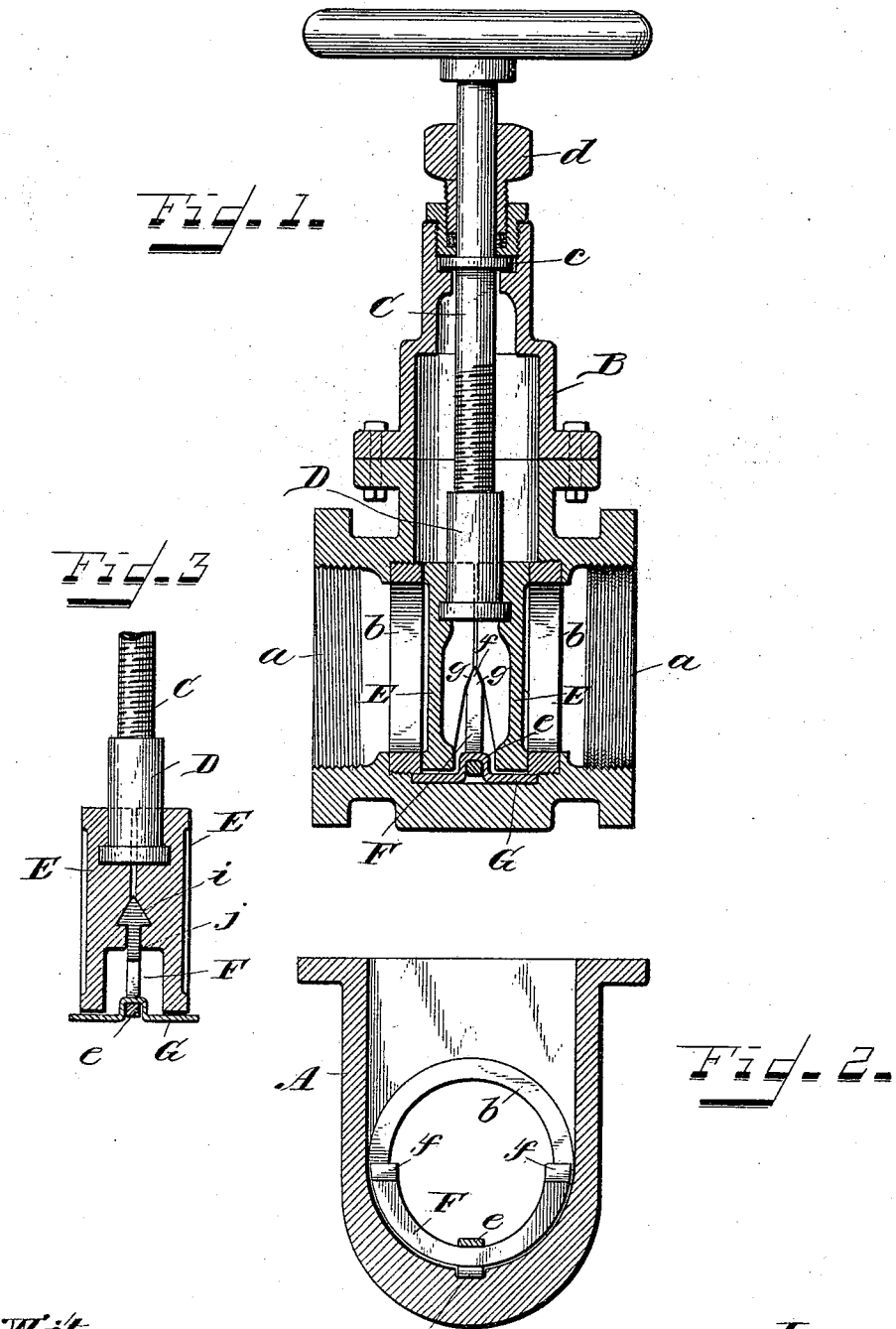

EDMUND LUNKENHEIMER, (BY JUDICIAL CHANGE OF NAME NOW EDMUND H. LUNKEN,) OF CINCINNATI, OHIO, ASSIGNOR TO THE LUNKENHEIMER COMPANY, OF SAME PLACE.

STRAIGHTWAY-VALVE.

SPECIFICATION forming part of Letters Patent No. 494,580, dated April 4, 1893.

Application filed May 4, 1892. Serial No. 431,828. (No model.)

*To all whom it may concern:*

Be it known that I, EDMUND LUNKENHEIMER, a citizen of the United States, residing at Cincinnati, in the county of Hamilton and State of Ohio, have invented certain new and useful Improvements in Straightway-Valves, of which the following is a full, clear, and exact description, reference being had to the accompanying drawings, forming part of this specification.

My invention relates to straight way or gate valves of that class having a pair of valves that when closed are wedged against their opposing seats, and it has for its object the improved construction of such valves, whereby the tight closing of the valves is rendered certain under all conditions and notwithstanding unequal wear of the wedging surfaces.

The novelty of my invention will be hereinafter set forth and specifically pointed out in the claims.

In the accompanying drawings:—Figure 1 is an axial section in elevation through a valve embodying my invention. Fig. 2 is a transverse section through the lower part of the valve case. Fig. 3 is a sectional detail representing a modification in the construction.

The same letters of reference are used to indicate identical parts in all the figures.

With the exceptions to be pointed out the valve may be of the usual or any suitable construction and, in describing it, it is only necessary to say that A is the body or case with pipe connections $a$ and opposing valve seats $b$, in this instance rings screwed into the body.

B is the bonnet, C the operating screw held from longitudinal movement by the collar $c$ and packed by a stuffing box $d$.

D is the sleeve engaged by the screw C and carrying, by means of its shouldered end, the valve disks E having recesses in their inner sides to engage the shouldered end of the sleeve.

Secured transversely in the bottom of the body is a half ring F whose upper ends are approximately on a diametrical line through the valve disks when closed. The outer edge of this half ring conforms to the shape of the interior of the body A and is supported thereby, and to hold it in place I prefer to employ a strap G recessed longitudinally in the bottom of the body and having its ends secured under and held by the rings. The strap G is bent up to form a box loop $e$ which embraces the half ring F but not so tightly as to prevent a partial turning of the half ring on the axis of its center and a slight tilting from side to side. Any other suitable means of securing the half ring in place may however be employed. The upper ends of the half ring are preferably beveled or made wedge shaped as shown at $f$ and the inner faces of the valve disks on each side have beveled bearing surfaces $g$ to engage the upper ends of the half ring just before the valve disks are seated, so that further seating motion of the operating handle causes the half ring to force the disks apart and causes them to close uniformly and tight against their seats, as will be readily understood.

A part of the advantage of my invention would be secured by making the half ring rigid but I prefer to have it movable in both the directions described for then it can always adjust itself to both sides of both valve disks to cause them to seat true and uniformly even after considerable wear of either the bearing surfaces $g$ of the disks or of the wedge ends of the half ring or both, as will be readily understood, for in this way the seating resistance of the one disk is applied directly to the other disk and both are seated uniformly and tight.

Although I have shown my invention as applied directly to the valve disks, it will be understood that the parts E might be simply carriers with valve disks adjustable upon their outer faces, and while I have shown the valve disks to be operated by a screw it is to be understood that any other suitable means may be employed for operating them. Again while I prefer to have the upper ends of the half ring wedge shaped yet my invention is not limited to such shape for they might be flat and the wedging be done as seen in Fig. 3 by a wedge or wedges $i$ carried by the disks and having pendent projections $j$ to be engaged by the tops of the half ring, as will be readily understood.

I am aware that it is not new to seat valve disks by interposed rigid wedges on the opposite sides, but,

Having thus fully described my invention, I claim—

1. In a straight way valve having opposing valve seats and valve disks, the body having a wedging half ring secured therein with its ends upward so as to be interposed between the disks when lowered to force them to their seats, substantially as described.

2. In a straight way valve having opposing valve seats and valve disks with wedging shoulders on an approximately diametrical line, the body having a wedging half ring secured therein with its ends upward so as to be interposed between the disks when lowered and to engage said wedging shoulders to force the disks to their seats, substantially as described.

3. In a straight way valve having opposing valve seats and valve disks, a self adjusting wedging half ring interposed between the valve disks to cause them to seat uniformly, substantially as described.

4. In a straight way valve, the combination of the body A, seats b, wedging half ring F, the valve disks E, wedging shoulders g, and means for opening and closing the valve disks, substantially as described.

EDMUND LUNKENHEIMER.

Witnesses:
J. THOMSON CROSS,
E. W. HARDINGHAUS.